United States Patent [19]

Tazelaar et al.

[11] Patent Number: 5,677,406
[45] Date of Patent: Oct. 14, 1997

[54] LENGTHENED DIFUNCTIONAL PERFLUOROPOLYETHER OILS AND RUBBERS PREPARED THEREWITH

[75] Inventors: Frans W. Tazelaar, Venlo; Peter R. Markies, De Lijndrijver; Johannes A. van den Reek, Eindhoven; Cornelius J.M. van der Stappen, Nijmegen, all of Netherlands

[73] Assignee: Oce-Nederland, B.V., Venlo, Netherlands

[21] Appl. No.: 734,952

[22] Filed: Oct. 23, 1996

[30] Foreign Application Priority Data

Oct. 23, 1995 [NL] Netherlands ............ 1001471
Oct. 23, 1995 [NL] Netherlands ............ 1001472

[51] Int. Cl.$^6$ ............ C08F 226/02; C08F 216/12; C08F 214/18; C08F 230/08; C07C 43/17
[52] U.S. Cl. ............ 526/312; 526/247; 526/279; 568/677
[58] Field of Search ............ 526/312, 247, 526/279; 568/677

[56] References Cited

U.S. PATENT DOCUMENTS 4,201,876  5/1980  Griffin ............ 568/677
4,933,408  6/1990  Goldenberg ............ 526/247

FOREIGN PATENT DOCUMENTS 0322624  7/1989  European Pat. Off. .
0621296  4/1994  European Pat. Off. .
0621298  4/1994  European Pat. Off. .

OTHER PUBLICATIONS abstract of L.
Perfluoropolyethers (PFPFs) from Perfluoroolefin Photooxidation, Fomblin and Galden Fluids, Dario Sianesi, Guiseppe Marchionni, and Ralph J. De Pasquale, Organofluorine Chemistry: Principles and Commercial Applications, edited by R.E. Banks et al., Plenum Press, New York, 1994, pp. 431–460.

Primary Examiner—Joseph L. Schofer
Assistant Examiner—W. C. Cheng
Attorney, Agent, or Firm—Birch, Stewart, Kolasch & Birch, LLP

[57] ABSTRACT

The invention relates to a difunctional perfluoropolyether oil, prepared by reacting a perfluoropolyether diol oil having a weight average molecular weight (Mw) of 1500 to 3000 with a chain lengthener selected from the group consisting of diacid chlorides and difunctional diisocyanates, and to perfluoropolyether rubbers prepared from these chain-lengthened oils.

5 Claims, No Drawings

LENGTHENED DIFUNCTIONAL PERFLUOROPOLYETHER OILS AND RUBBERS PREPARED THEREWITH

The present invention relates to difunctional perfluoropolyether oils and rubbers prepared from such oils.

Difunctional perfluoropolyether oils are known in the art; see D. Sianesi, Organofluorine Chemistry 1995, page 435. The properties of perfluoropolyether oils make them very favorable for use as oils, lubricants in car waxes, and so on. The functional oils are suitable as an intermediate product in the preparation of rubbers, release coatings and the like. One disadvantage, however, is that these oils have a relatively low molecular weight and this restricts their range of application.

The object of the invention is to provide difunctional perfluoropolyether diols with much higher molecular weights by means of a simple synthesis route. To this end, lower molecular weight difunctional perfluoropolyether diols are lengthened with a chain lengthener selected from the group consisting of diisocyanates and diacid chlorides.

In one embodiment of the invention, the diisocyanate chain lengthener used is a difunctional diisocyanate perfluoropolyether oil. The resulting difunctional perfluoropolyether oils may have OH or NCO terminal groups depending on the diol: diisocyanate ratio. Starting with molecular weights of 2000–2500 for the starting diol and the starting diisocyanate, it is a simple matter to obtain molecular weights of chain-lengthened perfluoropolyether ether oils of about 6000 to about 25,000.

In another embodiment of the invention, the diacid chloride used is

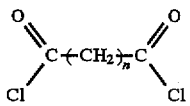

where n=0–4. The preferred chain lengthener used is glutaryl dichloride. Starting with a molecular weight of between 2000 and 2500 for the starting diol, it is possible to obtain molecular weights of between 4000 and 25,000 for chain-lengthened perfluoropolyether oils.

After cross-linking to form a rubber, these lengthened difunctional perfluoropolyether oils are very suitable as the top layer rubber, e.g. in fixing devices in hot roll fusers, as the top layer rubber on an intermediate medium as described in EP 0581355, and as adhesive coatings, release coatings, and so on. After curing, they are also suitable as anti-wetting coatings for nozzle plates of ink jet printheads.

This cross-linking can be carried out in various ways. One of the ways is to derivatize the functional terminal groups of the chains such that curing becomes possible under the influence of light, heat and/or moisture.

In a first embodiment of a method for obtaining a rubber by cross-linking, the OH-groups of a chain-lengthened perfluoropolyether diol are esterified with an acryloyl chloride.

Cross-linking then takes place with UV light in the presence of a photo-initiator at elevated temperatures. Cross-linking can also be effected by heating in the presence of a peroxide.

In a second embodiment of a method for obtaining a rubber by cross-linking, the OH groups in a chain-lengthened perfluoropolyether diol, HO—pfpe—OH, are converted with a urethane acrylate compound, such as

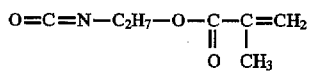

to give the perfluoropolyether structure

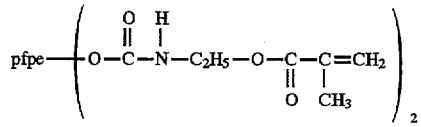

Isocyanate acrylates according to the molecular formula

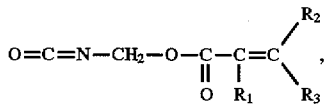

where p=1–5 and $R_1$, $R_2$ and $R_3$ can be jointly and independently selected from hydrogen and a lower alkyl group selected from the group consisting of methyl, ethyl, n-propyl, isopropyl, n-butyl and t-butyl, are employed in this type of reaction.

Cross-linking then takes place in the same way as in the first embodiment.

Suitable catalysts for the curing of urethane perfluoropolyethers include dibutyl tin dilaurate, dibutyl tin oxide, various iron derivatives such as ferroacetyl acetonate, tertiary amines, etc., in quantities from 0.001 to 2% by weight.

Perfluoropolyethers with (meth)acrylate or urethane (meth)acrylate terminal groups can be cross-linked
1) with the aid of peroxides such as dibenzoyl peroxide, 2,5-bis(tert-butylperoxy)-2,5-dimethylhexane, tert-butylperoxybenzoate, benzophenone, etc in quantities from 0.1 to 3% by weight in combination with heat (>100° C.) and 2) with the aid of photo-initiators such as α,α-diethoxyacetophenone, o-nitrobenzene diazonium hexafluoroantimonate, fluorenone, triphenyl amines, benzoin alkyl ethers, carbazole, etc., in combination with UV light.

Acrylate reactive perfluoropolyethers according to the invention are very suitable as an additive to improve the surface properties (non-wetting, antistatic) in ultraviolet (UV) or electron beam (EB) curing coatings based on various acrylates or methacrylates. Applications of these materials include the area of paper coatings, coating of plastics and glass articles and the like.

In a third embodiment, the OH groups of a chain-lengthened perfluoropolyether diol are converted with

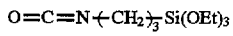

to form the perfluoropolyether

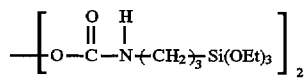

In general, compounds from the group

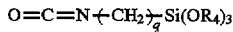

where q=1–4 and R is selected from the group consisting of methyl, ethyl, n-propyl and i-propyl can be used in this reaction.

Cross-linking then takes place under the influence of a catalyst such as tin octoate with water and with temperature elevation. It is a simple matter to cure these rubbers in air. One of the particular advantages of these transparent rubbers is their good conductivity. A thin layer of perfluoropolyether rubber according to the invention barely charges up, if at all, even after long periods of charging (up to 1 kV).

It has surprisingly been found that the perfluoropolyethers prepared as described above with —NH—C(O)-sequences in the terminal group, such as triethoxysilyl and urethane acrylate, preferably chain-lengthened with a coupler giving rise to C=O— or other polar groups in the main chain, exhibit a surface resistance of an order of magnitude of $10^8$–$10^9$ Ω.cm. This is a factor 100 to 1000 times lower than the surface resistance of perfluoropolyethers based on urethane cross-linking ($10^{12}$ Ω.cm) and various other unfilled elastomers, such as (fluoro)-silicone rubber. This property makes the layers based on the perfluoropolyethers of the invention intrinsically antistatic.

Although we do not wish to speculate about the conducting mechanism in the perfluoropolyether layers, a possible explanation can be observed in the presence of ions in the product, caused by the various steps in the preparation, by which a form of ion-conductivity can arise in the layer.

Control of this ion-conductivity in perfluoropolyether polyether products (oils and rubbers) can be done via two mechanisms, i.e., (1) variation of the molecular structure by the introduction of polar relaxation mechanisms using polar groups, for example, by the introduction of polyethylene oxide groups in the polymer chains and (2) the addition and variation of various ions, such as quaternary ammonium salts and lithium salts to the perfluoropolyether matrix.

Possible applications for the products of the invention include using these layers as transparent top layers on intermediates as described in EP 0581355, transparent conductive toner coatings, transparent non-stick coatings on photoconductors and other image-forming media, as indicated, for example, in U.S. Pat. No. 5,319,334, on transport rollers and the like. Other possible applications where transparency and conductivity are necessary are, for example, in the motor vehicle industry, the carpet industry, and in optical instruments.

In order to further improve the mechanical properties, it is possible to cross-link mixtures of chain-lengthened perfluoropolyether oils provided with reactive groups. The elastic properties and tear strength can be controlled by the appropriate choice of reactants.

The invention will now be described in greater detail with reference to a number of examples, but the invention is not limited thereto.

EXAMPLE 1

Chain lengthening of lower molecular weight hydroxy-terminated perfluoropolyether oils was performed as follows in a 3-neck flask provided with a top agitator, dropping funnel (with gas circulation) and a spherical condenser. The flask was continuously washed with nitrogen. 500 g of OH-terminated perfluoropolyether oil, HO-perfluoropolyether-OH, with a weight average molecular weight (Mw) of approximately 2150 g/mol, was weighed into the 3-neck flask. 10.2 g of glutaryl dichloride was added dropwise in 1 hour via the dropping funnel with agitation at 0° C. After 24 hours at 100° C., a viscous substantially clear light orange liquid was obtained. This oil, having the structure

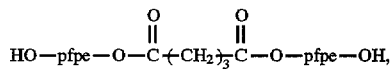

can be converted to rubber in the same way as described in Example 2 below. The above reaction can also be repeated by reacting the product of the reaction with glutaryl dichloride again under the same conditions. The result is the formation of a product having the following structure:

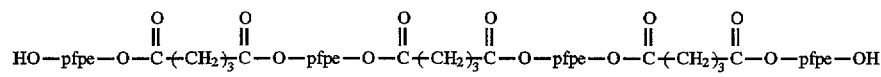

This compound theoretically has a molecular weight of about 8900 g/mol. In practice, molecular weights (Mws) of 6500 (100° C., 24 hours) and 11,000 (160° C., 24 hours), can be obtained depending on the reaction temperature. This oil can also be further extended in the same way by again reacting the product for 24 hours at 100° C. with glutaryl dichloride. In this way an OH-terminated perfluoropolyether oil was synthesized with a molecular weight of 11,000 and with a molecular weight of 25,000 g/mol in the case of reaction at 160° C.

All of these oils can be converted to a rubber in the same way as described in Example 2 below.

EXAMPLE 2

98.1 g (11.2 mmol) of perfluoropolyether diol (HO-perfluoropolyether-OH), 25 g of 1,1,2 trifluorotrichloroethane and 5 g of triethylamine were cooled in an ice bath to 0° C. in a 250 ml 4-neck flask provided with an agitator, nitrogen inlet, a closed dropping funnel (with gas circulation) and a spherical condenser. 3 g (33.1 mmol) of acryloyl chloride

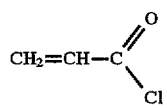

was dissolved in 40 g of 1,1,2-trifluorotrichloroethane ethane in the dropping funnel. This solution was added dropwise with agitation to the mixture in the 4-neck flask. The resulting white-yellow dispersion was kept at 55° C. for 1 hour, whereupon 50 ml of ethanol was added. The resulting strongly yellow mixture was then agitated for 15 minutes at 50° C. whereupon it was cooled. The acrylate-terminated oil obtained in this way was washed with a 1,1,2-trifluorotrichloroethane/ethanol mixture. After evaporation of the solvents, 87 g (yield 88%) of a clear light-brown acrylate-terminated oil remained having the following structure:

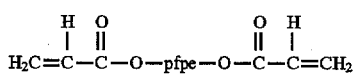

This oil was mixed with a photo-initiator, i.e., 20 µl of 2,2-diethoxyacetophenone per 10 g of acrylate-terminated oil.

This mixture was applied as a top layer to a metal cylinder provided with an approximately 20 mm thick layer of peroxide hardened silicone rubber. The approximately 60 µm thick top layer was then cured in a nitrogen atmosphere by means of a UV lamp. The resulting clear rubber is strong and elastic. The glass transition temperature of the rubber is about −125° C.

EXAMPLE 3

Chain lengthening on the basis of a urethane reaction was carried out in a 250 ml reaction vessel with a top agitator, nitrogen inlet and a thermometer. 50.6 g of OCN—perfluoropolyether$^I$—NCO with an Mw of 2562 g/mol, 89.3 g of HO-perfluoropolyetherII-OH with an Mw of 2258 g/mol and 1.5 g of catalyst solution (1 wt % dibutyl tin dilaurate in 1,1,2-trichlorotrifluoroethane) were reacted together. This reaction mixture was heated for 1 hour at 75° C. under nitrogen. The resulting chain-lengthened perfluoropolyether oil having the structure

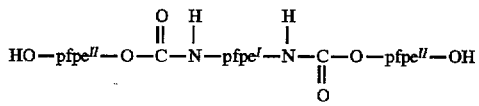

was then provided with acrylate end groups according to the method of Example 1. Utilizing benzoyl peroxide and heat, the oil provided with 2.5% carbon black was finally converted to a top layer rubber. The mixture with benzoyl peroxide was for this purpose placed in a layer about 60 µm thick on a substrate. The layer was then cured at a temperature of about 140° C.

EXAMPLE 4

A rubber was made in the same way as in Example 3, using an 80:20 mixture of a perfluoropolyether, HO—pfpe—OH, and a perfluoropolyether tetraol used as the perfluoropolyether diol having the following structure:

CH$_2$OH—CH (OH)—H$_2$C—O—CH$_2$—F$_2$C—pfpe—CF$_2$CH$_2$—O—CH$_2$CH (OH)—CH$_2$OH The presence of the perfluoropolyether tetraol increased the cross-link density after cross-linking with, for example, acrylate groups in the resulting rubber, so that the rubber hardness was increased.

EXAMPLE 5

184.1 g of perfluoropolyether diol with an Mw of about 2200, 19.55 g of 2-isocyanatoethyl methacrylate

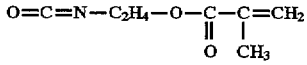

and 0.11 g of dibutyl dilaurate were stirred for 4½ hours at room temperature in a 3-neck flask with a condenser, agitator and nitrogen inlet. The resulting product was worked up with 1,1,2-trifluorotrichloroethane and stirred with 20 µl of diethoxyacetophenone per 10 g of perfluoropolyether oil. The product was then cured in one operation in a nitrogen atmosphere by means of a UV lamp (UV-C: wavelength about 360 nm).

After about 15 minutes a well-cured clear antistatic rubber was obtained.

EXAMPLE 6

61.85 g of chain-lengthened perfluoropolyether diol according to Example 2 with an Mw of about 11,000, 2.95 g of 3-(triethoxysilyl)propylisocyanate and 0.65 g of catalyst solution (1 wt % dibutyl tin dilaurate in tetrahydrofuran) was agitated at room temperature for 15 hours. NMR analysis of the resulting clear oil showed that the OH groups of the chain-lengthened perfluoropolyether diol were completely converted.

The oil was then mixed with 1 wt % tin octoate. The resulting mixture was applied in a layer approximately 60 µm thick to a fabric belt provided with about 2.5 mm peroxide-hardened silicone rubber. This perfluoropolyether layer was air cured for about 4 hours. The resulting non-stick clear rubber had good visco-elastic properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A difunctional perfluoropolyether oil prepared by a process which comprises reacting a perfluoropolyether diol oil having a weight average molecular weight of about 1500 to 3000 with a chain lengthener selected from the group consisting of diacid chlorides and difunctional diisocyanate perfluoropolyether oils.

2. A difunctional perfluoropolyether oil according to claim 1, wherein the chain lengthener is a diacid chloride having the molecular formula

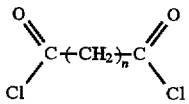

where n=0–4.

3. A difunctional perfluoropolyether oil according to claim 2, wherein the diacid chloride is glutaryl dichloride.

4. A perfluoropolyether rubber, wherein the rubber is prepared from a derivatized perfluoropolyether diol oil chain-lengthened according to any of claims 1 to 3, wherein the OH terminal groups are derivatized with a compound selected from the group consisting of acryloyl chlorides, isocyanate acrylates according to the molecular formula:

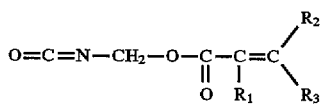

where p=1–5 and R$_1$, R$_2$ and R$_3$ are jointly and independently chosen from hydrogen and a lower alkyl group selected from the group consisting of methyl, ethyl, n-propyl, isopropyl, n-butyl and t-butyl and compounds having the molecular formula:

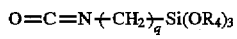
where q=1–4 and $R_4$ is methyl, ethyl, n-propyl or i-propyl, whereafter the derivatized perfluoropolyether oils are cross-linked in the presence of a suitable catalyst.
5. A perfluoropolyether rubber according to claim 4, wherein the derivatized perfluoropolyether diol oil has a surface resistance of approximately $10^8$–$10^9$ $\Omega.cm$.
* * * * *